(12) United States Patent
Suzuki

(10) Patent No.: US 7,670,239 B2
(45) Date of Patent: Mar. 2, 2010

(54) BELT TYPE CONTINUOUSLY VARIABLE TRANSMISSION

(75) Inventor: Hideaki Suzuki, Tokyo (JP)

(73) Assignee: JATCO Ltd, Fuji-shi (JP)

( * ) Notice: Subject to any disclaimer, the term of this patent is extended or adjusted under 35 U.S.C. 154(b) by 788 days.

(21) Appl. No.: 11/447,093

(22) Filed: Jun. 6, 2006

(65) Prior Publication Data

US 2006/0276279 A1 Dec. 7, 2006

(30) Foreign Application Priority Data

Jun. 7, 2005 (JP) ............................. 2005-166951

(51) Int. Cl.
*F16H 55/56* (2006.01)
(52) U.S. Cl. .............................. 474/8; 474/18; 474/28
(58) Field of Classification Search ................. 474/18, 474/28, 8
See application file for complete search history.

(56) References Cited

U.S. PATENT DOCUMENTS

| | | | |
|---|---|---|---|
| 6,533,702 B1 | 3/2003 | Asyama et al. | |
| 7,229,373 B2 | 6/2007 | Yamamoto et al. | |
| 2004/0127313 A1* | 7/2004 | Shimanaka et al. | 474/18 |
| 2004/0171444 A1* | 9/2004 | Yamamoto et al. | 474/28 |
| 2005/0014604 A1* | 1/2005 | Sakakibara et al. | 477/45 |
| 2005/0070402 A1* | 3/2005 | Kimura et al. | 477/46 |

FOREIGN PATENT DOCUMENTS

| | | |
|---|---|---|
| DE | 100 57 855 A1 | 6/2001 |
| DE | 10 2004 007 631 A1 | 9/2004 |
| JP | 9-203459 A | 8/1997 |

* cited by examiner

*Primary Examiner*—Robert A Siconolfi
*Assistant Examiner*—Robert T Reese
(74) *Attorney, Agent, or Firm*—Foley & Lardner LLP

(57) ABSTRACT

Usually, the speed change control of the transmission is carried out in accordance with a real speed ratio "i" provided based on a primary pulley rotation speed "N1" and a secondary pulley rotation speed "N2". While, when, at the time of stopping the vehicle, the real speed ratio fails to return to a value corresponding to the lowest speed position of the transmission, it is judged that there is a speed change failure. Upon this judgment, hydraulic pressures "p1" and "p2" for varying practical diameters of the primary and secondary pulleys are fixed to predetermined values "p1(old)" and "p2(old)" provided for such speed change failure.

8 Claims, 11 Drawing Sheets

BELT TYPE CONTINUOUSLY VARIABLE TRANSMISSION

BACKGROUND OF THE INVENTION

1. Field of the Invention

The present invention relates in general to belt type continuously variable transmissions of a wheeled motor vehicle, and more particularly to the belt type continuously variable transmissions of a type that comprises a primary pulley driven by an engine, a secondary pulley driven by the primary pulley through a belt, a primary pulley rotation speed sensor for detecting a rotation speed of the primary pulley, a secondary pulley rotation speed sensor for detecting a rotation speed of the secondary pulley, and a control system by which a target speed ratio (viz., a target value represented by dividing rotation speed (Np) of the primary pulley by that (Ns) of the secondary pulley) between the maximum speed ratio (viz., a low speed side speed ratio) and the minimum speed ratio (viz., a high speed side speed ratio) is calculated based on the detected rotation speeds of the primary and secondary pulleys and by which primary and secondary pulley pressures operatively applied to the respective primary and secondary pulleys are so controlled as to put a real speed ratio actually taken by the transmission into agreement with the calculated target speed ratio.

2. Description of the Related Art

As is known, the belt type continuously variable transmissions are of a type that can continuously vary a speed ratio that is the ratio between a rotation speed of the primary pulley and that of the secondary pulley. More specifically, the speed ratio is a value represented by dividing the rotation speed (Np) of the primary pulley by that (Ns) of the secondary pulley. Usually, a control system is associated with the transmission so that the speed ratio is continuously varied in accordance with an operation condition of an associated motor vehicle.

As is described in Japanese Laid-open Patent Application (Tokkaihei) 9-203459, for sensing the operation condition of the transmission, the rotation speeds of the primary and secondary pulleys are detected and, a target speed ratio of the transmission is calculated based on the detected rotation speeds of the primary and secondary pulleys and other information on the operation condition and, primary and secondary pulley pressures operatively applied to the primary and secondary pulleys are so controlled as to put a real speed ratio actually taken by the transmission into agreement with the calculated target speed ratio.

As is known, the rotation speed sensors for the primary and secondary pulleys can not detect a rotation speed that is lower than a predetermined level. For dealing with this undesirable fact, a technique has been employed wherein the target speed ratio is so set as to return the real speed ratio to the minimum speed ratio (viz., the ratio corresponding to the lowest speed position of the transmission) prior to the time when the rotation speed is no longer detected by the rotation speed sensor, and at the same time, the primary pulley pressure and the secondary pulley pressure are controlled in such a manner that the real speed ratio takes the target value while avoiding undesired slippage of the belt to the primary and secondary pulleys.

However, as is known, the speed ratio control has a limit in suppressing the slippage of the belt. Thus, for example, in case wherein the vehicle is forced to stop in a short time with a rapid deceleration, it tends to occur that the real speed ratio fails to return to the minimum speed ratio until the time when the rotation speed sensor can no longer detect the rotation speed. In this case, it is unclear whether the real speed ratio has returned to the minimum speed ratio or not, which tends to bring about a so-called speed change failure.

If the speed change control is continuously carried out even after the rotation speed sensor fails to detect the rotation speed, undesired belt slippage tends to occur because the speed change condition is not detected even if the change speed shows an excessive value. Furthermore, upon restarting of the vehicle, the undesired belt slippage tends to occur because of failure of detecting the real speed ratio. Furthermore, even if the speed change control is put off or delayed until the time when the rotation speed sensor begins to detect the rotation speed of the pulley, application of an excessive torque tends to induce the undesired belt slippage.

SUMMARY OF THE INVENTION

It is therefore an object of the present invention to provide a belt type continuously variable transmission, which is free of the above-mentioned drawbacks.

According to the present invention, there is provided a belt type continuously variable transmission, which can suppress the undesired belt slippage under standstill of the transmission or upon restarting of its practical operation even if the above-mentioned speed change failure occurs, and can minimize the lowering in performance of the transmission at the restarting of the vehicle.

In accordance with a first aspect of the present invention, there is provided a belt type continuously variable transmission of a motor vehicle, which comprises a primary pulley adapted to be driven by a prime mover; a secondary pulley adapted to be connected to drive road wheels of the vehicle; a belt operatively put around the primary and secondary pulleys; first and second hydraulically actuating systems for varying a practical diameter of the primary pulley and that of the secondary pulley by being applied with first and second hydraulic pressures respectively; first and second rotation speed sensors that detect a rotation speed of the primary pulley and that of the secondary pulley respectively; and a control unit that varies a speed ratio between the primary and secondary pulleys by controlling the first and second hydraulically actuating systems, the control unit having an ability of putting a real speed ratio into agreement with a target speed ratio that is calculated based on the rotation speeds of the primary and secondary pulleys detected by the first and second rotation speed sensors, the target speed ratio being set between a value corresponding to the lowest speed position of the transmission and a value corresponding to the highest speed position of the transmission; wherein the control unit comprises a real speed ratio calculating section that calculates the real speed ratio based on the rotation speeds of the primary and secondary pulleys detected by the first and second rotation speed sensors; a speed change failure detecting section that detects a speed change failure when, at the time of stopping the vehicle, at least one of the first and second rotation speed sensors fails to detect the corresponding rotation speed, the speed change failure being a failure wherein at the time of stopping the vehicle, the real speed ratio fails to return to the value corresponding to the lowest speed position of the transmission; and a pulley pressure fixing section that, when the speed change failure is detected, fixes the first and second hydraulic pressures to predetermined values provided for the speed change failure.

In accordance with a second aspect of the present invention, there is provided a belt type continuously variable transmission of a motor vehicle, which comprises a primary pulley adapted to be driven by a prime mover; a secondary pulley adapted to be connected to drive road wheels of the vehicle; a belt operatively put around the primary and secondary pulleys; first and second hydraulically actuating systems for varying a practical diameter of the primary pulley and that of the secondary pulley by being applied with first and second hydraulic pressures respectively; first and second rotation speed sensors that detect a rotation speed of the primary pulley and that of the secondary pulley respectively; and a control unit that varies a speed ratio between the primary and secondary pulleys by controlling the first and second hydraulically actuating systems, the control unit having an ability of putting a real speed ratio into agreement with a target speed ratio that is calculated based on the rotation speeds of the primary and secondary pulleys detected by the first and second rotation speed sensors, the target speed ratio being set between a value corresponding to the lowest speed position of the transmission and a value corresponding to the highest speed position of the transmission; wherein the control unit comprises a real speed ratio calculating means that calculates the real speed ratio based on the rotation speeds of the primary and secondary pulleys detected by the first and second rotation speed sensors; a speed change failure detecting means that detects a speed change failure when, at the time of stopping the vehicle, at least one of the first and second rotation speed sensors fails to detect the rotation speed, the speed change failure being a failure wherein at the time of stopping the vehicle, the real speed ratio fails to return to the value corresponding to the lowest speed position of the transmission; a pulley pressure fixing means that, when the speed change failure is detected, fixes the first and second hydraulic pressures to predetermined values provided for the speed change failure; an allowable input torque calculating means that, when the speed change failure is detected, calculates an allowable input torque based on at least one of the first and second hydraulic pressures, at least one of the rotation speed of the primary pulley and that of the secondary pulley, and the target speed ratio, the allowable input torque being a torque that is fed to the primary pulley from the prime mover while satisfying the condition of the transmission just before the speed change failure; a restart time input torque restriction means that controls the input torque to the allowable input torque when an action for restating the vehicle takes place; and a canceling means that, upon restarting of the vehicle, cancels the operation of the pulley pressure fixing section and that of the restart time input torque restriction means when the first and second rotation speed sensors are both able to detect the rotation speed.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings, which is a belt type continuously variable transmission.

Figure 1:
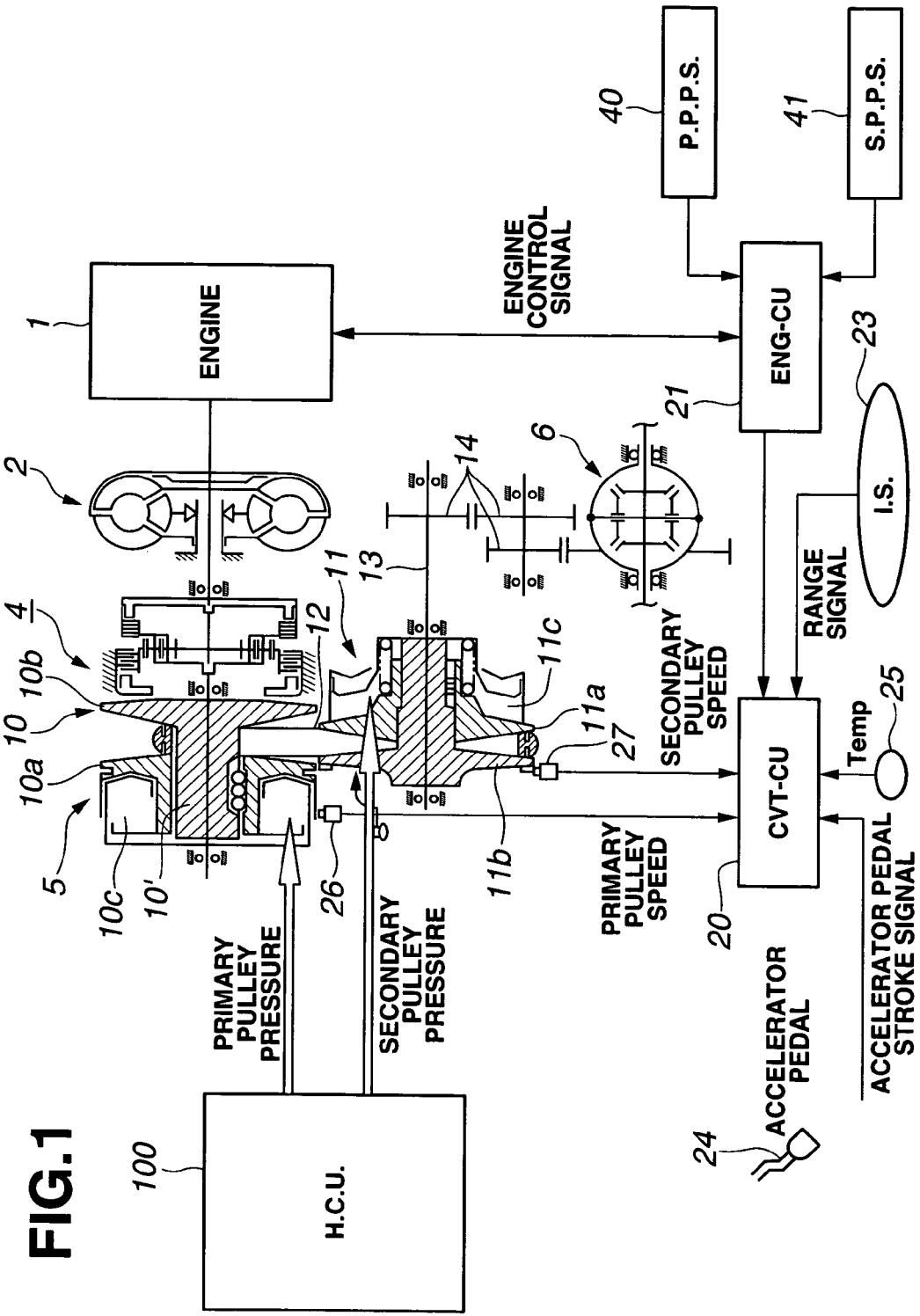
FIG. 1 is a schematic diagram of a belt type continuously variable transmission according to the present invention.

Referring to FIG. 1, there is shown a diagram of a belt type continuously variable transmission according to the present invention.

In FIG. 1, denoted by numeral 5 is the belt type continuously variable transmission of the present invention, which will be referred to "belt-CVT" for ease of description. The belt-CVT 5 is connected to an engine 1 (which is, for example, an internal combustion engine or the like) through a torque converter 2 and a forward/backward switch mechanism 4. In the illustrated embodiment, the torque converter 2 is of a type having a lock-up clutch.

As shown, the belt-CVT 5 comprises a primary pulley 10 serving as an input means, a secondary pulley 11 serving as an output means and a V-belt 12 operatively put on both the primary and secondary pulleys 10 and 11. These pulleys 10 and 11 are of a so-called diameter variable type. That is, due to a force of variable hydraulic pressure applied thereto, the practical diameter of each pulleys 10 and 11 is varied, which induces variation of the speed ratio of the transmission 5.

As shown, an output shaft 13 of the secondary pulley 11 is connected to a differential gear 6 through idler gears 14 and idler shafts (no numerals) in a known manner.

A speed ratio (viz., a ratio between the rotation speed of the primary pulley 10 and that of secondary pulley 11) of the belt-CVT 5 and a contact friction force of the V-belt 12 are governed by a hydraulic pressure control unit 100 that is controlled by instruction signals issued from a CVT control unit 20. That is, based on an input torque information from an engine control unit 21 that controls the engine 1 and information from after-mentioned sensors, the CVT control unit 20 controls the speed ratio and the contact friction force through the hydraulic pressure control unit 100.

The primary pulley 10 comprises an axially fixed conical disc 10b that is rotatable with an input shaft 10' and an axially movable conical disc 10a that is axially movable relative to the axially fixed conical disc 10b to define therebetween a width-variable V-shaped groove for receiving the V-belt 12. The axial movement of the axially movable conical disc 10a is controlled by a hydraulic pressure (viz., primary pulley pressure) applied to a primary pulley cylinder chamber 10c.

Like the above-mentioned primary pulley 10, the secondary pulley 11 comprises an axially fixed conical disc 11b that is rotatable with the output shaft 13 and an axially movable conical disc 11a that is axially movable relative to the axially fixed conical disc 11b to define therebetween a size-variable V-shaped groove for receiving the V-belt 12. The axial movement of the axially movable conical disc 11a is controlled by a hydraulic pressure (viz., secondary pulley pressure) applied to a secondary pulley cylinder chamber 11c.

Under operation, a drive torque from the engine 1 is inputted to the primary pulley 10 of the belt-CVT 5 through the torque converter 2 and the forward/backward switch mechanism 4, and transmitted to the secondary pulley 11 through the V-belt 12 and transmitted to drive road wheels (not shown) through the output shaft 14, the gears 14 and the differential gear 6.

When, under the transmission of the drive torque, the axially movable conical discs 10a and 11a are subjected to an axial movement, an actual radius of each disc 10a or 11a is varied. Actually, if one disc 10a or 11a is axially moved in a direction to narrow the groove, the other disc 11a or 10a is moved in a direction to widen the groove. With this, the speed rate of the secondary pulley 11 relative to the primary pulley 10 is continuously changed thereby to continuously vary the speed ratio of the transmission 5.

As is mentioned hereinabove, the speed ratio of the belt-CVT 5 and the contact friction force of the V-belt 12 to the pulleys are controlled by the hydraulic pressure control unit 100.

Figure 2:
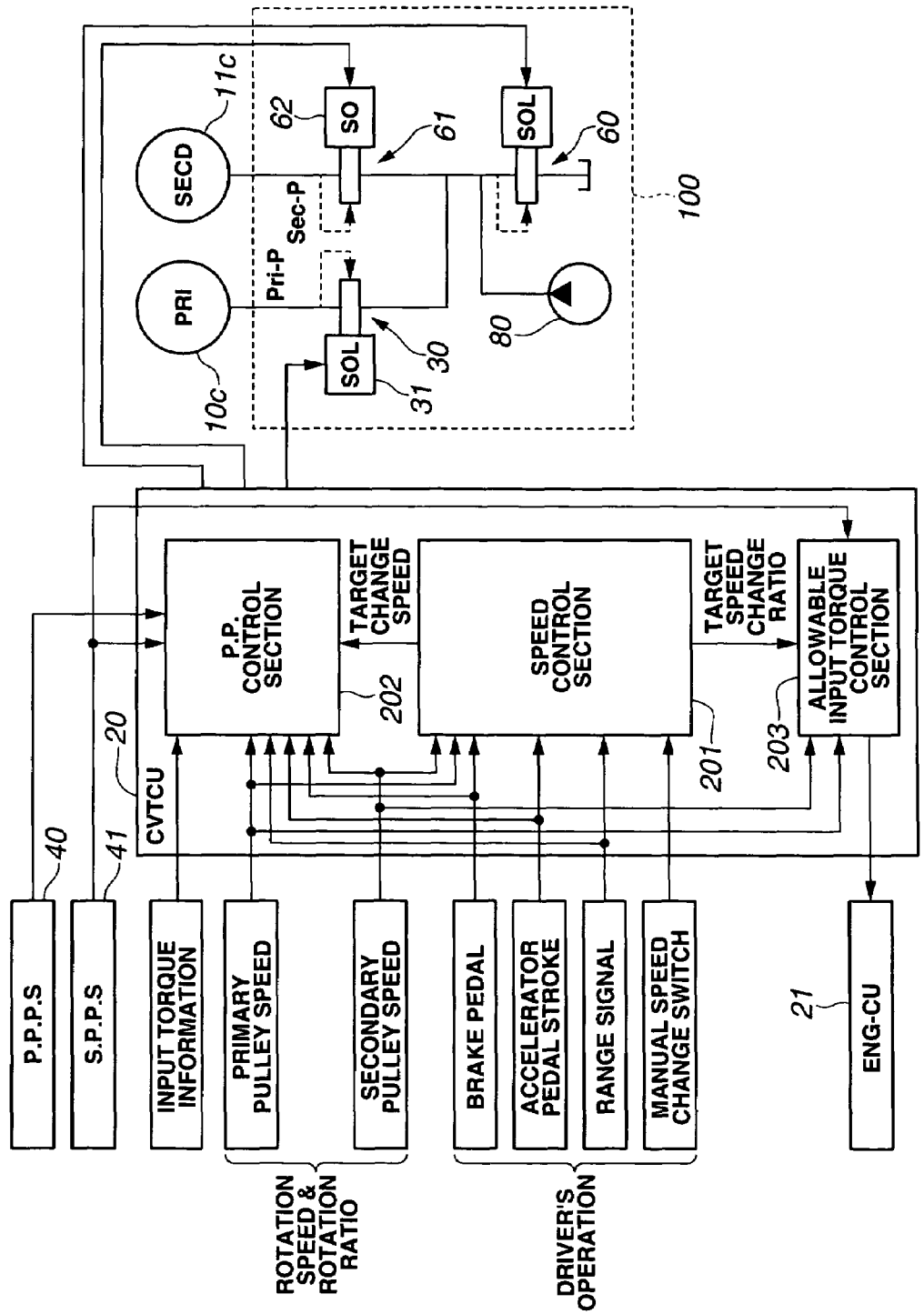
FIG. 2 is a schematic diagram showing both a CVT control unit and a hydraulic control unit which are employed in a control system used in the present invention.

As is seen from the diagram of FIG. 2, the hydraulic pressure control unit 100 comprises a regulator valve 60 that controls a line pressure, a pressure reducing valve 30 that controls the hydraulic pressure (viz., primary pulley pressure) in the primary pulley cylinder chamber 10c, and another pressure reducing valve 61 that controls a hydraulic pressure (viz., secondary pulley pressure) fed to the secondary pulley cylinder chamber 11c.

A line pressure control system has the regulator valve 60 that has a solenoid for adjusting a hydraulic pressure fed thereto from a hydraulic pump 80. That is, upon receiving instruction signals from the CVT control unit 20, the regulator valve 60 produces a predetermined line pressure PL.

The line pressure PL is fed to both the pressure reducing valve 30 that has a solenoid 31 to control the primary pulley pressure "Pri-P" and the other pressure reducing valve 61 that has a solenoid 62 to control the secondary pulley pressure "Sec-P".

A pulley ratio between the primary and secondary pulleys 10 and 11 is controlled by the two pressure reducing valves 30 and 61 that are controlled by speed change instruction signals issued from the CVT control unit 20. That is, by the work of the pressure reducing valves 30, the line pressure LP is adjusted to produce the primary pulley pressure Pri-P applied to the cylinder chamber 10c of the primary pulley 10, and by the work of the other pressure reducing valve 61, the line pressure LP is adjusted to produce the secondary pulley pressure Sec-P applied to the cylinder chamber 11c of the secondary pulley 11. With this action, the size of the V-shaped groove of each pulley 10 or 11 is continuously varied thereby to set or adjust the pulley ratio.

It is to be noted that the pulley ratio is a ratio between the rotation speed of the primary pulley 10 and that of the secondary pulley 11, and the speed ratio is a ratio that is derived from the pulley ratio with consideration of the gear ratio of the idler gears 14.

As is seen from FIG. 1, by processing an information signal from a primary pulley speed sensor 26 that detects the rotation speed of the primary pulley 10, an information signal from a second pulley speed sensor 27 that detects the rotation speed of the secondary pulley 11, a shift position representing signal from an inhibitor switch 23, an accelerator pedal depressed degree representing signal from an accelerator pedal stroke degree sensor 24 that detects a moved or depressed degree of an accelerator pedal and an oil temperature representing signal from an oil temperature sensor 25 that detects the temperature of the oil in the belt-CVT 5, the CVT control unit 20 controls continuously the speed ratio and the contact friction force of the V-belt 12. In place of the accelerator pedal depressed degree representing signal, an information signal representing the open degree of a throttle valve may be used.

Figure 7:
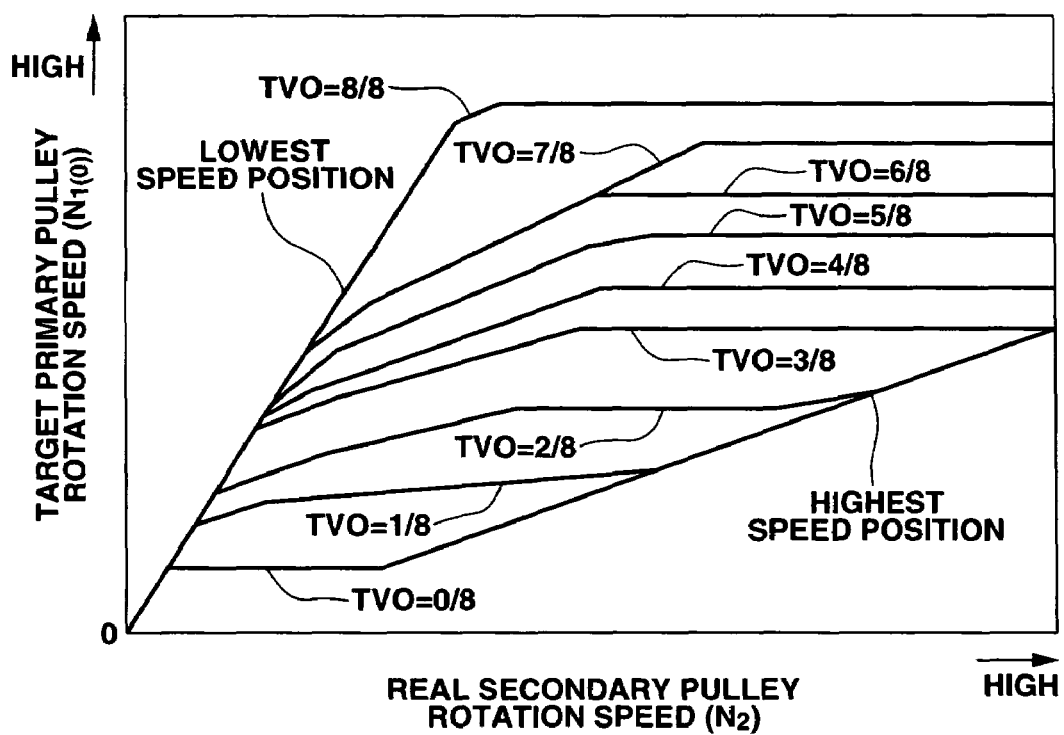
FIG. 7 is a data map used for looking up a target primary pulley rotation speed from both a throttle valve open degree and a real rotation speed of a secondary pulley.

In accordance with the rotation speed "N1" of the primary pulley 10, the rotation speed "N2" (or vehicle speed) of the secondary pulley 11 and a driver's intention that is represented by the accelerator pedal depressed degree (or the throttle valve open degree TVO), ON/OFF condition of a brake pedal, switching of shift range and switching movement of a speed change switch in a manual mode, the CVT control unit 20 determines a target speed ratio "I" and a target change speed, between the value of the lowest speed position and the value of the highest speed position, with reference to a predetermined speed change map such as one as shown in FIG. 7.

As is seen from FIG. 2, the CVT control unit 20 generally comprises a speed change control section 201 that functions to control a real speed ratio "i" to the target speed ratio "I", a pulley pressure control section 202 that controls the thrust of the primary and secondary pulleys 10 and 11 (or the contact friction force of the V-belt 12 to such pulleys 10 and 11) in accordance with the input torque, the real speed ratio "i", the target changed speed, ON/OFF condition of the brake pedal, the accelerator pedal depressed degree and the shift range, and an allowable input torque control section 203 that, based on the pulley pressure of each pulley 10 or 11, the rotation speed of each pulley 10 or 11 and the target speed ratio "I", derives an after-mentioned an allowable input torque "TL" and outputs an information signal on the derived torque "TK" to the engine control unit 21.

Based on the input torque information, the pulley ratio (viz., the ratio between N1 and N2), ON/OFF condition of the brake, the accelerator pedal depressed degree and the shift range, the pulley pressure control section 202 determines a target value of the line pressure. By energizing the solenoid of the regulator valve 60, the line pressure is controlled. Furthermore, the control section 202 determines respective target values "P1" and "P2" of the primary pulley pressure "p1" and second pulley pressure "p2". By controlling the solenoids 31 and 62 of the pressure reducing valves 30 and 61 in accordance with the target values "P1" and "P2", the primary pulley pressure "p1" and the secondary pulley pressure "p2" are independently controlled. Accordingly, the pulley pressure that would be reduced upon a speed change can be controlled thereby to avoid the undesired slippage of the V-belt 12 relative to the pulleys 10 and 11.

In the following, a hydraulic control executed by the pulley pressure control section 202 of the CVT control unit 20 will be described in detail with reference to the flowchart of FIG. 3.

It is to be noted that the operation flow of the programmed operation steps of the flowchart is carried out periodically at a predetermined period, that is, for example, every several tens msec (millisecond).

Figure 3:
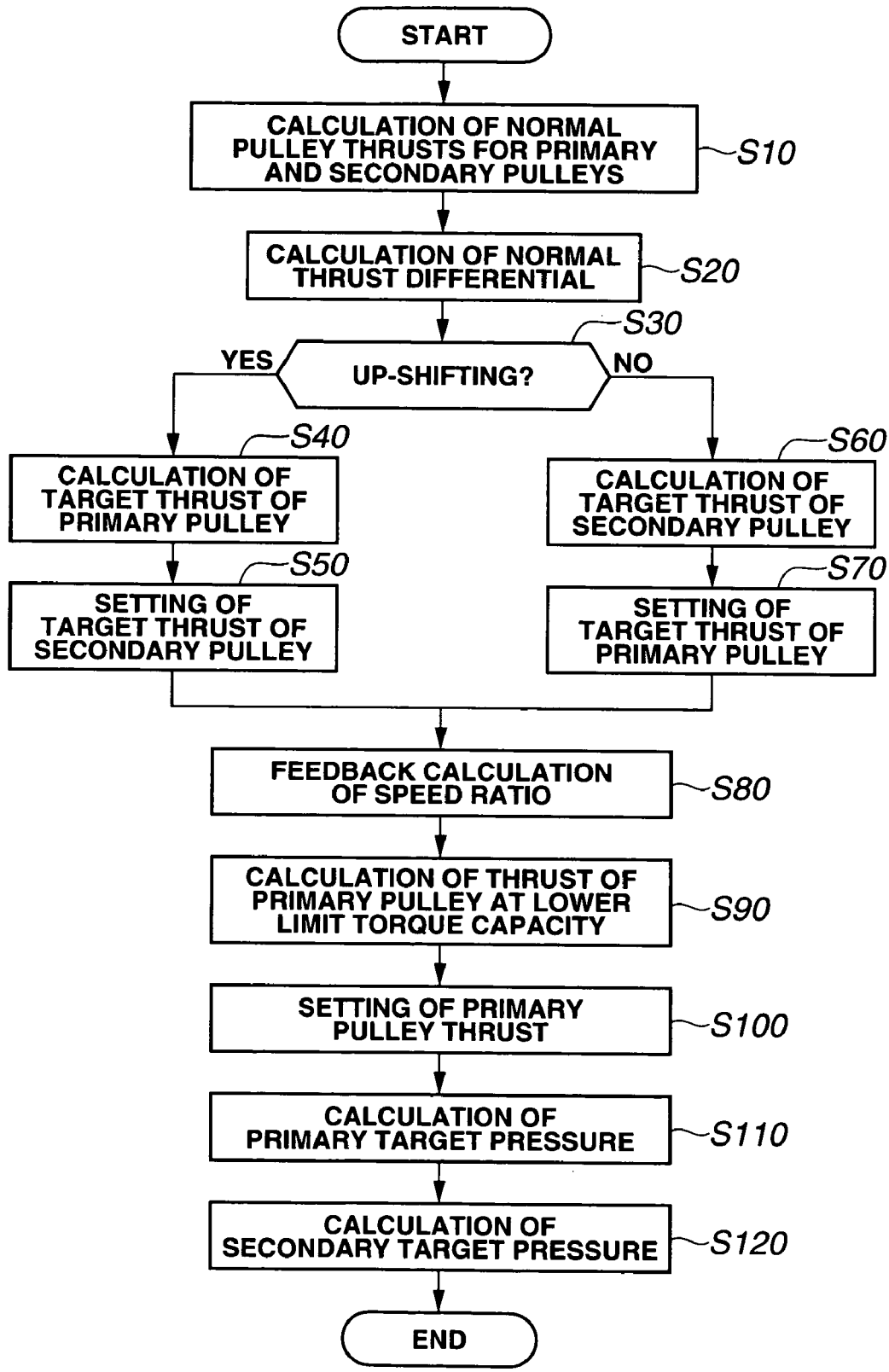
FIG. 3 is a flowchart showing programmed operation steps that are executed by the CVT control unit for setting a target value of pulley pressure.

In the flowchart of FIG. 3, at step S10, normal pulley thrusts for the primary and secondary pulleys 10 and 11 are calculated. It is to be noted that the normal pulley thrust is the thrust (viz., a torque capacity or a hydraulic pressure for producing the torque capacity) that establishes and keeps an existing pulley ratio while suppressing the undesired slippage of the V-belt 12.

Figure 4:
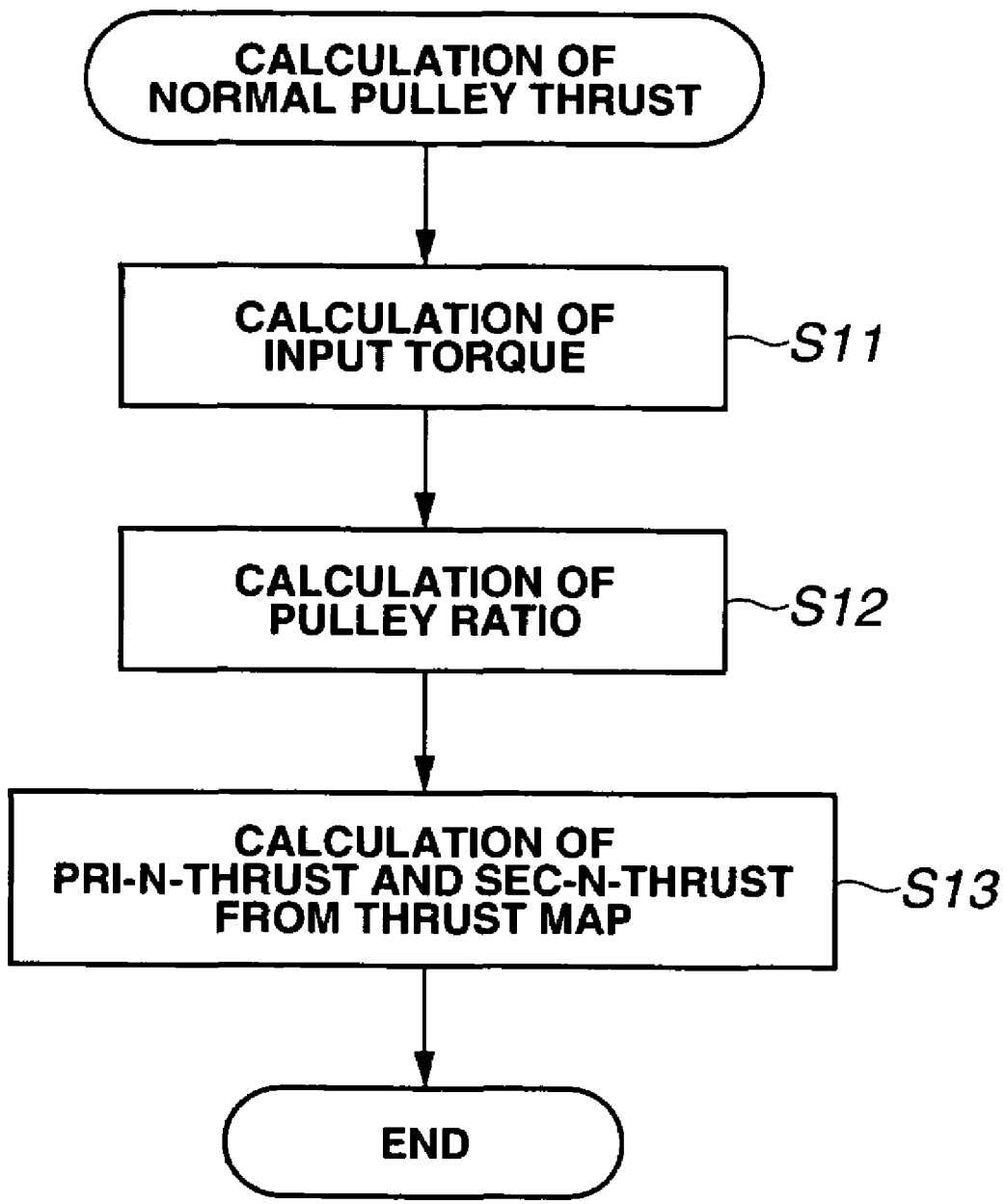
FIG. 4 is a flowchart showing programmed operation steps that are executed for calculating a normal pulley thrust.

FIG. 4 shows a flowchart for calculating the normal pulley thrust. The programmed operation steps of this flowchart are executed in the pulley pressure control section 202 of the CVT control unit 20.

At step S11 of the flowchart of FIG. 4, a torque "T" inputted to the primary pulley 10 is calculated. This input torque "T" is determined by the output torque of the engine 1. However, in case wherein the torque transmission to the primary pulley 10 is made through the torque converter 2, a torque ratio of the torque converter 2 should be considered.

At step S12, a target pulley ratio is calculated. The target pulley ratio is calculated from both the vehicle speed and the accelerator pedal depressed degree (or throttle valve open degree). A real pulley ratio is a ratio between the rotation speed "N1" of the primary pulley 10 and that "N2" of the secondary pulley 11.

Figure 8A:
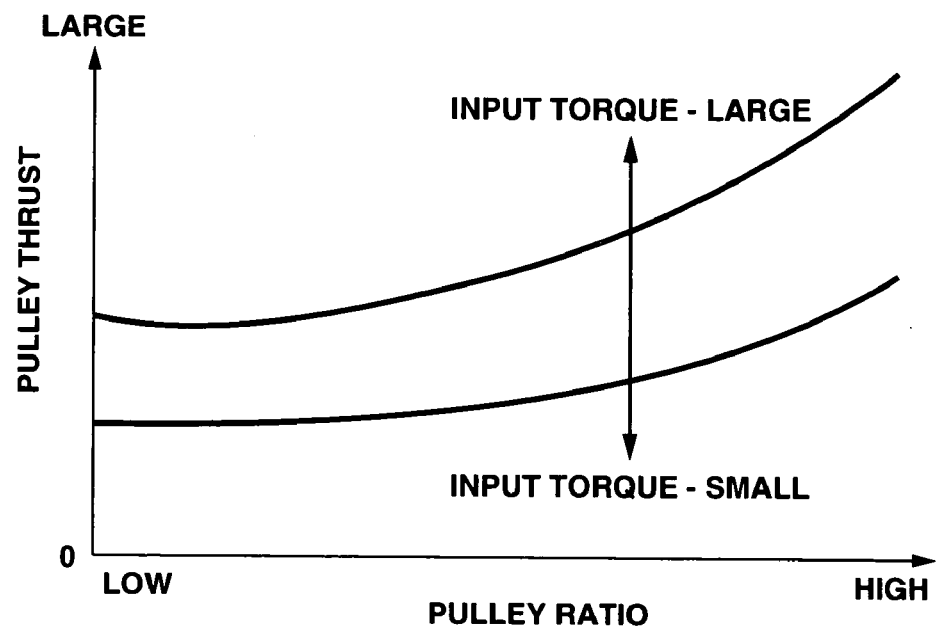
FIG. 8A is a data map used for looking up a pulley thrust from both a pulley ratio and an input torque.

At step S13, a thrust of each pulley 10 or 11 at the time of normal cruising is calculated from the calculated target pulley ratio with reference to the data map (or thrust map) of FIG. 8A. This data map is provided by mapping a relationship between the input torque, the pulley ratio and the pulley thrust. That is, at step S13, a normal primary pulley thrust "PRI-N-thrust" and a normal secondary pulley thrust "SEC-N-thrust" are calculated.

Referring back to FIG. 3, at step S20, a speed change thrust differential between the primary and secondary pulleys 10 and 11 is calculated.

Figure 5:
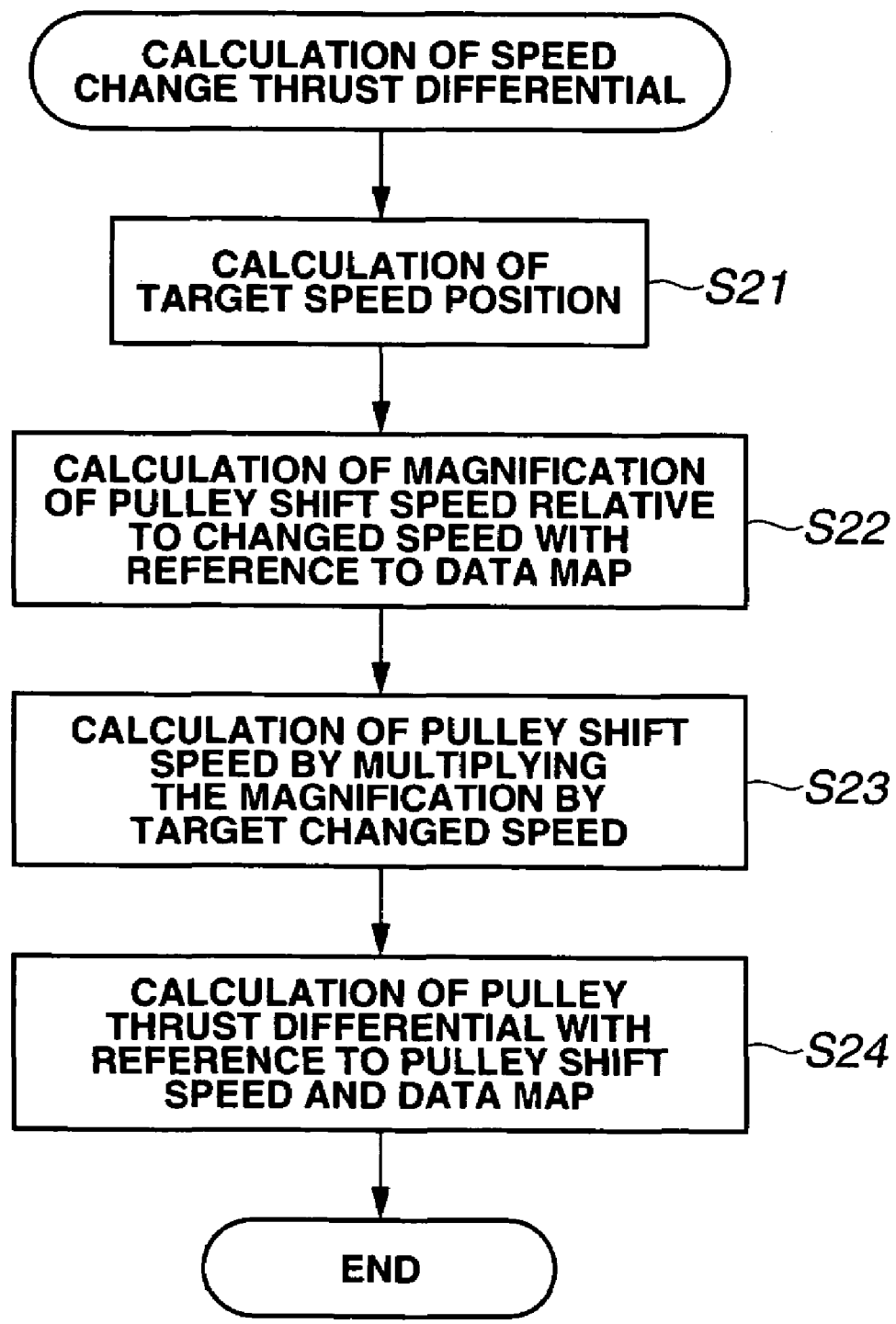
FIG. 5 is a flowchart showing programmed operation steps that are executed for calculating a speed change pulley thrust.

FIG. 5 shows a flowchart for calculating the speed change thrust differential. The programmed operation steps of this flowchart are executed in the pulley pressure control section 202 of the CVT control unit 20.

At step S21 of the flowchart of FIG. 5, a target changed speed is calculated based on the vehicle speed, the shift range and the accelerator pedal depressed degree. This calculation is carried out in the speed change control section 201. The calculated target changed speed is outputted to the pulley pressure control section 202.

Figure 8B:
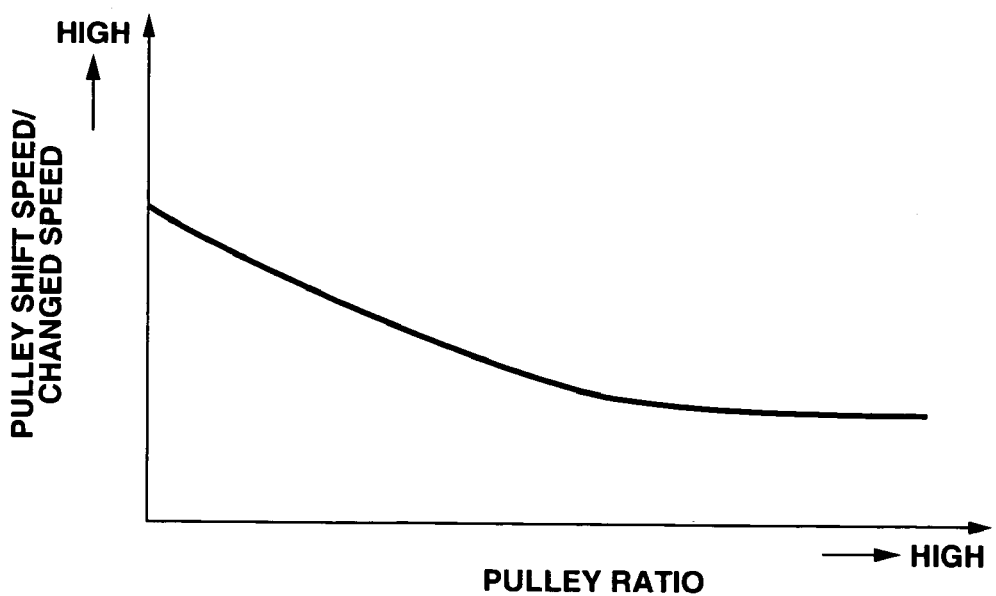
FIG. 8B is a data map used for looking up magnification of a pulley shift speed relative to a changed speed from the pulley ratio.

At step 522, magnification of a pulley shift speed (viz., the speed at which the pulley moves axially) relative to the pulley speed is calculated from the pulley ratio and the target changed speed with reference the data map of FIG. 8B. This calculation is carried out in the pulley pressure control section 202.

At step S23, the magnification of the pulley shift speed calculated at step S22 is multiplied by the target changed speed to device a pulley shift speed.

Figure 9:
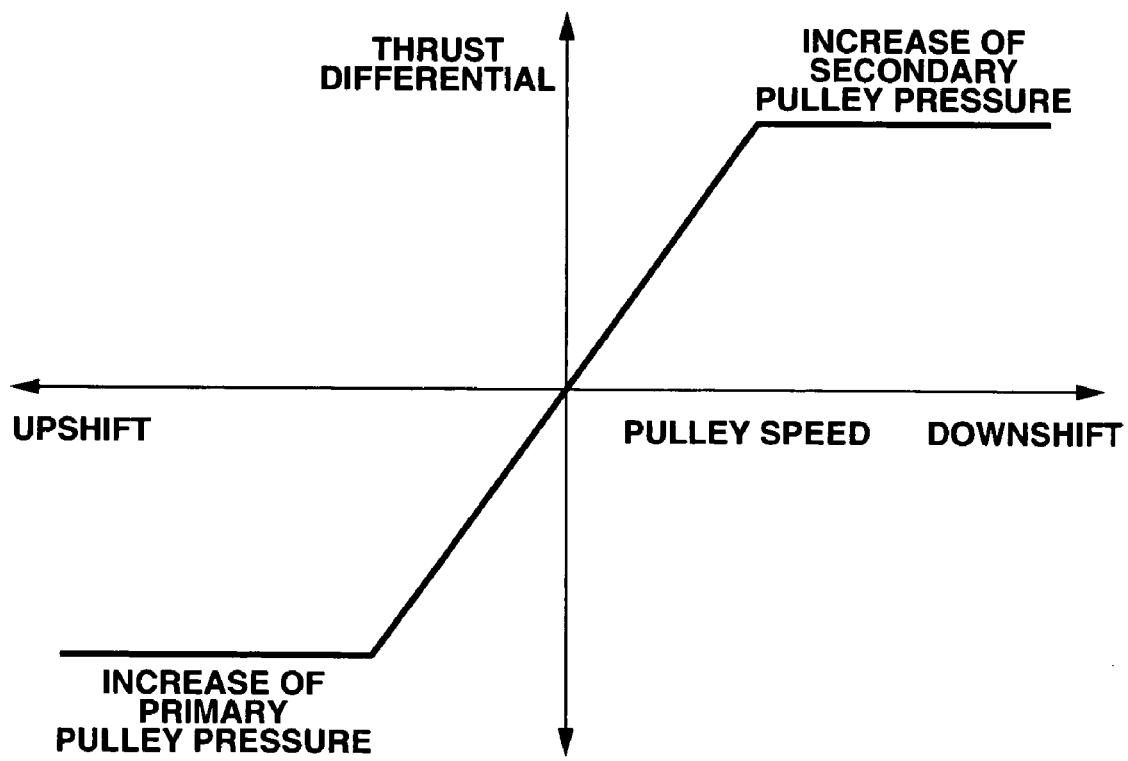
FIG. 9 is a data map used for looking up a pulley thrust differential from the pulley speed.

At step S24, based on the derived pulley shift speed, a pulley thrust differential is calculated with reference to the data map of FIG. 9. The map of FIG. 9 is so set that under down-shifting, the pulley thrust differential indicates a speed change thrust of the secondary pulley 11, and under up-shifting, the pulley thrust differential indicates a speed change thrust of the primary pulley 10.

In the map of FIG. 9, the speed change thrust of the secondary pulley 11 (that is, the downshift side of the pulley thrust differential) is set to a value that is derived by providing the pulley thrust differential, that is needed for establishing the target changed speed calculated at the step S21, with a certain margin.

Referring back to the flowchart of FIG. 3, at step S30, judgment is carried out as to whether the subsequent shift operation calculated by the speed change control section 201 is an up-shifting or not (viz., down-shifting). If YES, that is, if the shift operation is the up-shifting, the operation flow goes to step S40 to calculate a target thrust (or target hydraulic pressure) of the primary pulley 10. While, if NO, that is, if the shift operation is the down-shifting, the operation flow goes to step S60 to calculate a target thrust (or target hydraulic pressure) of the secondary pulley 11.

The target thrust of the primary pulley 10 to be calculated at step S40 is derived by adding the normal pulley thrust of the primary pulley 10 calculated at step S10 and the speed change thrust differential calculated at step S20. Then, at step S50, the normal thrust of the secondary pulley 11 calculated at step S10 is set to a target thrust of the secondary pulley 11.

Like the above, the target thrust of the secondary pulley 11 to be calculated at step S60 is derived by adding the normal pulley thrust of the secondary pulley 11 calculated at step S10 and the speed change thrust differential calculated at step S20. Then, at step S70, the normal thrust of the primary pulley 10 is set to a target thrust of the primary pulley 10.

After the step S50 or S70, the operation flow goes to step S80 to calculate the thrust of the primary pulley 10 by using a feedback control.

Figure 6:
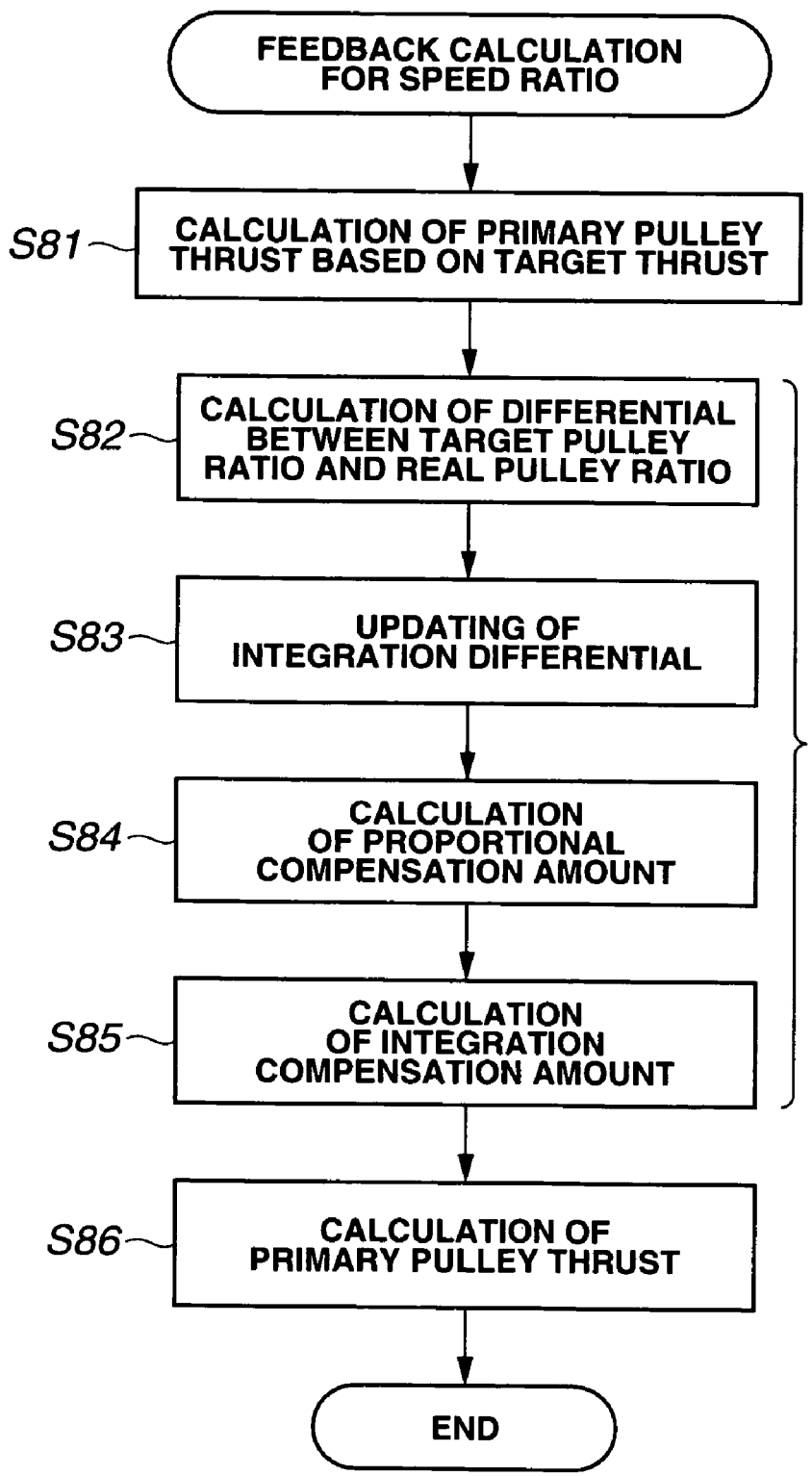
FIG. 6 is a flowchart showing programmed operation steps that are provided for explaining a speed ratio feedback control carried out in the present invention.

FIG. 6 is a flowchart showing a method for calculating the thrust of the primary pulley 10 in accordance with a speed ratio feedback control. In this method, the thrust of the primary pulley 10 is subjected to a feedback correction, so as to be matched with the target speed ratio "I". Of course, this feedback correction may be applied to the calculation of the thrust of the secondary pulley 11. Because of the feedback control by which the speed ratio "i" is controlled to the target speed ratio "I", the speed change can be made precisely.

In the following, the method of calculating the thrust of the primary pulley 10 will be described with reference to the flowchart of FIG. 6.

At step S81, based on the target thrust of the primary pulley 10 calculated at step S40 or step S70, a primary pulley thrust is calculated by using a feed-forward control.

Then, at step S82, a differential between the target pulley ratio and the real pulley ratio is derived.

At step S83, to the differential calculated at step S82, there is added a previous value of the integration differential of the speed change system to derive a new integration differential.

At step S84, to the derived integration differential, there is multiplied a proportional gain of the speed change system to derive a proportional compensation amount.

At step S85, to the integration differential set at step S33, there is multiplied an integration gain to derive an integration compensation amount.

Then, at step S86, the primary pulley thrust calculated at step S81, the proportional compensation amount calculated at step S84 and the integration compensation amount calculated at step S85 are added together to derive a primary pulley thrust "PRI thrust". Because of establishment of the calculation of the thrust, a manipulated variable of the pulley can be controlled.

In the illustrated embodiment, the flow of the operation steps from the step S82 to the S85 is of a PI (proportional integral) control. Of course, in place of such PI control, other type control may be used.

Referring back to the flowchart of FIG. 3, at step S90, a thrust of the primary pulley 10 corresponding to the lower limit torque capacity calculated from both the input torque and the real speed ratio "i" is calculated. It is to be noted that the lower limit torque capacity is the lowest value of the torque that avoids the undesired slippage of the V-belt 12 to the pulley.

Then, at step S100, a higher or larger one is selected between the target thrust of the primary pulley 10 calculated at step S70 and the thrust of the primary pulley 10 at the lower limit torque capacity calculated at step S90, and the selected one is set to a primary pulley thrust.

At step S110, a target primary pulley pressure "P1" is derived by dividing the primary pulley thrust by a belt contact area of the primary pulley 10.

At step S120, a target secondary pulley pressure "P2" is derived by dividing the secondary target thrust (or target thrust of secondary pulley 11), which is calculated at step 550 or S60, by a bent contact area of the secondary pulley 11.

Thus, when, for example, a downshift is carried out by depression of the accelerator pedal, the hydraulic pressure "p1" fed to the secondary pulley 11 is controlled to the target value "P1" that, as is mentioned hereinabove, is derived by adding the normal thrust and the speed change thrust, and the hydraulic pressure "p2" fed to the primary pulley 10 is controlled to the target value "P2" that, as is mentioned hereinabove, is derived by adding the normal thrust and the feedback compensation part (viz., proportional compensation amount+integration compensation amount).

In the following, operation of the present invention will be described with reference to FIGS. 10 and 11.

Figure 10:
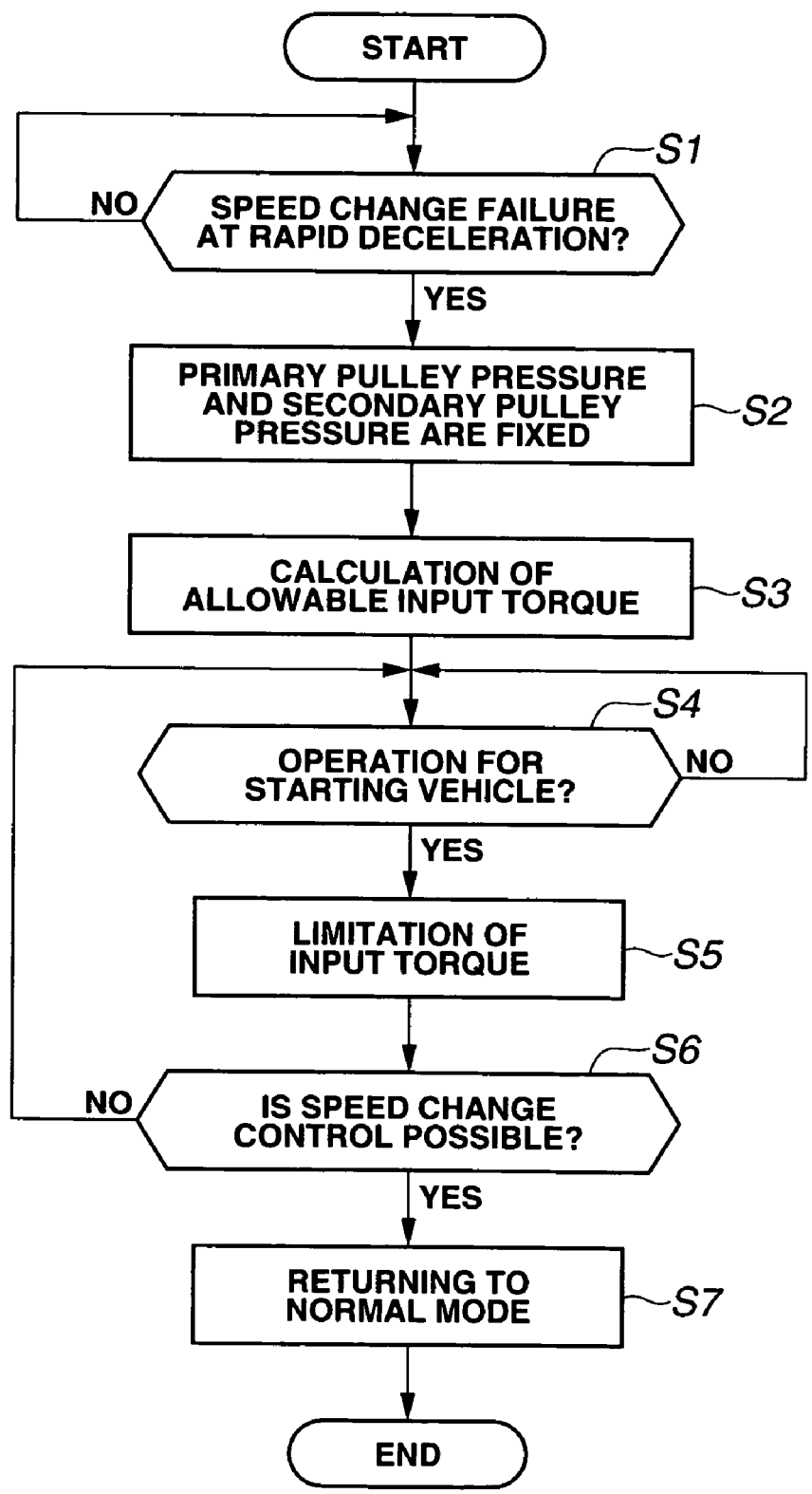
FIG. 10 is a flowchart showing programmed operation steps that are executed for controlling both a primary pulley pressure and a secondary pulley pressure in case wherein at the time of stopping the vehicle it is judged that there is a speed change failure.

FIG. 10 is a flowchart showing programmed operation steps executed by the CVT control unit 20 for controlling the hydraulic pressure of the primary and secondary pulleys 10 and 11 at the time when, under deceleration of an associated motor vehicle for its stopping, a speed change failure has occurred. The speed change failure is a failure wherein under such vehicle deceleration, the real speed ratio "i" fails to return to the value corresponding the lowest speed position. The flowchart further shows programmed operation steps executed by the control unit 20 for controlling the input torque "T" of the belt-CVT 5 at the time when, after stopping of the vehicle with such failure, the vehicle is restarted. The operation flow of the programmed operation steps is carried out periodically at a predetermined period, that is, for example, every several tens msec (millisecond). Starting of the operation flow may be made by sensing a brake-ON signal that is produced when a brake pedal is depressed.

At step S1, judgment is carried out as to whether a speed change failure has occurred or not at the time when the vehicle is subjected to deceleration for its stopping. As is mentioned hereinabove, the speed change failure is a failure wherein the real speed ratio fails to return to the value corresponding the lowest speed position of the transmission 5. For such judgment, the following method is practically used.

That is, a difference "ΔI" between the real speed ratio "i" and the target speed ratio "I" is constantly calculated. The speed change failure is judged YES when, with the difference "ΔI" differing from a predetermined value "Io" that varies in accordance with the type of the vehicle and the operation condition of the vehicle, at least one of the primary and secondary pulley speed sensors 26 and 27 fails to detect the rotation speed "N1" or "N2" of the primary pulley 10 or the secondary pulley 11.

It has been revealed that such speed change failure occurs mainly at the time when the vehicle is subjected to a rapid stopping. In view of this, usage of the following measures is preferable. That is, an accelerometer is used for detecting the acceleration of the vehicle and an information signal from the accelerometer is constantly applied to the pulley pressure control section 202 of the CVT control unit 20. And, as one of the factors that judge the speed change failure, a deceleration "G" calculated from the information signal from the accelerometer is used. If this method is practically employed, the condition wherein the vehicle will stop without the speed change failure can be removed, and thus, the reliability on the judgment of the speed change failure is raised, resulting in that the control of the primary and secondary pulley pressure can be assuredly carried out only in a desired condition.

If NO at step S1, the operation flow goes back to Start. That is, when it is found that the deceleration of the vehicle is below a predetermined value "Go", the rotation speed "N1" or "N2" of one of the primary and secondary pulleys 10 and 11 fails to be detected and the difference "ΔI" between the real speed ratio "i" and the target speed ratio "I" does not differ from the predetermined value "Io", it is judged that the vehicle has no such speed change failure at the vehicle stopping.

While, if YES at step S1, the operation flow goes to step S2. That is, when it is found that the deceleration of the vehicle is higher than the predetermined value "Go", the rotation speed "N1" or "N2" of one of the primary and secondary pulleys 10 and 11 fails to be detected and the difference "ΔI" between the real speed ratio "i" and the target speed ratio "I" differs from the predetermined value "Io", it is judged that the vehicle has such speed change failure at the vehicle stopping. In this case, the operation flow goes to step S2.

If the judgment at step S1 is made without using an information signal on the deceleration of the vehicle, there is no need of using an accelerometer. Thus, in this case, simple and low cost construction of the control system of the present invention is achieved.

At step S2, the primary pulley pressure "p1" and the secondary pulley pressure "p2" are respectively fixed to the primary pulley pressure and the primary pulley pressure that appear when the judgment of the speed change failure takes place.

It is to be noted that each of the primary pulley pressure and the secondary pulley pressure at the time when the judgment of the speed change failure takes place has two types one of which is selectable as will be described in the following.

That is, as a first type, as is seen from FIG. 1, there are provided both a primary pulley pressure sensor 40 that detects the real primary pulley pressure "p1" and a secondary pulley pressure sensor 41 that detects the real secondary pulley pressure "p2". The detected real primary pulley pressure "p1" and the detected secondary pulley pressure "p2" are constantly applied to the pulley pressure control section 202 of the CVT control unit 20. That is, the real primary pulley pressure "p1" and the real secondary pulley pressure "p2" that appear at the time when the judgment of the speed change failure takes place are set to the primary pulley pressure and the secondary pulley pressure at such time.

In this case, the real primary pulley pressure "p1" detected by the sensor 40 and the real secondary pulley pressure "p2" detected by the other sensor 41 are constantly memorized in RAM (viz., random access memory) of the pulley pressure control section 202, and when the judgment of the speed change failure takes place, the solenoids 31 and 62 (see FIG. 2) of the pressure reducing valves 30 and 61 are instructed to control or set the respective pressures to the real primary pulley pressure "p1(old)" and the real secondary pulley pressure "p2(old)" which have been memorized. With this method, in accordance with the judgment of the speed change failure, the primary pulley pressure "p1" and the secondary pulley pressure "p2" are fixed to the real primary pulley pressure "p1(old)" and the real secondary pulley pressure "p2(old)" at the time of the judgment.

Thus, when, at the time of stopping the vehicle, it is judged that a speed change failure occurs, the speed change control toward the value of the lowest speed position is suspended and the primary pulley pressure and the secondary pulley pressure are fixed to the predetermined values at the speed change failure. With this, the belt-CVT 5 tends to show a difficulty with which a speed change takes place. Accordingly, undesired belt slip caused by an excessive change speed and undesired belt vertical slippage are suppressed or at least minimized. It is to be noted that the belt vertical slippage is an undesired phenomenon wherein even when, due to stopping of the vehicle, a power transmission is not carried out, feeding of the primary pulley pressure "p1" or feeding of the secondary pulley pressure "p2" is kept thereby to push up or move up or squeeze the V-belt 12 on the corresponding pulley 10 or 11.

In the present invention, the real primary pulley pressure "p1" and the real secondary pulley pressure "p2" are detected by the respective sensors 40 and 41, and these real pulley pressures "p1" and "p2" are respectively set to the primary pulley pressure "p1(old)" and the secondary pulley pressure "p2(old)" at the time when, at the stopping of the corresponding vehicle, it is judged that a speed change failure takes place. With this, at the time when the speed change failure occurs, the primary pulley pressure "p1" and the secondary pulley pressure "p2" are set to the values that have been shown when the last speed change control has been properly carried out. Thus, the above-mentioned undesired phenomena are assuredly suppressed.

As a second type, as has been mentioned in the flowchart of FIG. 3, based on the primary pulley rotation speed "N1" and the secondary pulley rotation speed "N2", at step S110, the target primary pulley pressure "P1" is derived, and at step S120, the target secondary pulley pressure "P2" is derived. That is, the target primary pulley pressure "P1" and the target secondary pulley pressure "P2" just before the judgment of the speed change failure are set to the primary pulley pressure and the secondary pulley pressure at the judgment of the speed change failure.

In this case, the target primary pulley pressure "P1" derived at step S110 and the target secondary pulley pressure "P2" derived at step S120 are constantly memorized in RAM of the pulley pressure control section 202, and when the judgment of the speed change failure takes place, the solenoids 31 and 62 (see FIG. 2) of the pressure reducing valves 30 and 61 are instructed to control or set the respective pressures to the target primary pulley pressure "P1(old)" and the target secondary pulley pressure "P2(old)" which have been memorized just before the judgment of the speed change failure. With this method, in accordance with the judgment of the speed change failure, the primary pulley pressure "p1" and the secondary pulley pressure "p2" are respectively fixed to the target primary pulley pressure "P1" and the target secondary pulley pressure "P2" that have been shown just before the judgment of the speed change failure.

Also in this type, when, at the time of stopping the vehicle, it is judged that a speed change failure occurs, the speed change control toward the value of the lowest speed position is suspended and the primary pulley pressure and the secondary pulley pressure are fixed to the predetermined values at the speed change failure. Thus, the belt-CVT 5 tends to show a difficulty with which a speed change takes place. Accordingly, undesired belt slip caused by an excessive change speed and undesired belt vertical slippage are suppressed or at least minimized.

Particularly, in the second type, there is no need of employing pressure sensors, such as those 40 and 41, that detect the real primary pulley pressure "p1" and the real secondary pulley pressure "p2". Accordingly, simple and low cost construction of the control system of the present invention is achieved.

It is to be noted that the pulley pressure control section 202 that carries out the programmed steps of S110 and S120 constitutes a target pulley pressure calculating means, and the pulley pressure control section 202 and the hydraulic pressure control unit 100 constitute a pulley pressure fixing control means.

Referring back to the flowchart of FIG. 10, at step S3, based on the primary pulley pressure and the secondary pulley pressure at the time of judgment of the speed change failure, the primary pulley rotation speed "N1" and the secondary pulley rotation speed "N2" at the time of judgment of the speed change failure, and the target speed ratio "I" just before judgment of the speed change failure, an allowable input torque "TL" that is sufficient to keep the condition of the belt-CVT 5 at the judgment of the speed change failure is calculated.

Specifically, the allowable input torque "TL" is derived based on the primary pulley pressure and the secondary pulley pressure at the time of judgment of the speed change failure, the primary pulley rotation speed "N1" and the secondary pulley rotation speed "N2" at the time of judgment of the speed change failure and the target speed ratio "I" stored in place of the real speed ratio "i". It is be noted that the allowable input torque "TL" corresponds to the toque "T" calculated at step S11 of the flowchart of FIG. 4.

If desired, for shortening the processing, the following measures may be used. That is, a data map is provided that indicates an allowable input torque "TL" in accordance with the secondary pulley pressure, the primary pulley rotation speed "N1" and the target speed ratio "I". The data map is stored in the CVT control unit 20. Upon judgment of the speed change failure, the allowable input torque "TL" is looked up from the data map, which is suitable for the secondary pulley pressure, the primary pulley rotation speed "N1" and the target speed ratio "I" that would appear just before the judgment of the speed change failure. Of course, another data map may be used that indicates an allowable input torque "TL" in accordance with the primary pulley pressure, the secondary pulley rotation speed "N2" and the target speed ratio "I". Also, in this case, the data map is stored in the CVT control unit 20.

It is to be noted that each of the primary pulley pressure and the secondary pulley pressure at the time of judgment of the speed change failure has two types one of which will is selectable in a manner as will be described in the following.

That is, as a first type, in case of calculating the allowable input torque "TL" by using the real primary pulley pressure "p1(old)" and the real secondary pulley pressure "p2(old)" that are detected at the time of judgment of the speed change failure, a centrifugal pressure produced under rotation of the primary and secondary pulleys 10 and 11 is considered because such centrifugal pressure affects the real primary pulley pressure "p1" and the real secondary pulley pressure "p2". For calculation of the allowable input torque "TL", the torque "TL" can take its highest but allowable value by a degree that corresponds to the centrifugal pressure. Accordingly, a vehicle starting performance is increased while avoiding undesired belt slippage.

In a second type, the allowable input torque "TL" is calculated by using the target primary pulley pressure "P1(old)" and the target secondary pulley pressure "P2(old)" at the time of judgment of the speed change failure. In this case, there is no need of employing the pressure sensors, such as the sensors 40 and 41, that detect the real primary pulley pressure "p1" and the real secondary pulley pressure "p2". Accordingly, simple and low cost construction of the control system of the invention is achieved.

In case of calculating the allowable input torque "TL" by using the target primary pulley pressure "P1(old)" and the target secondary pulley pressure "P2(old)", the feedback control for the primary pulley pressure and the secondary pulley pressure based on the real primary and secondary pulley pressures "p1" and "p2" can not be made without the primary and secondary pulley pressure sensors 40 and 41. Accordingly, in such case, the preciseness in calculating the allowable input torque "TL" is somewhat lowered as compared with another case wherein the allowable input torque "TL" is calculated by using the real primary pulley pressure "p1(old)" and the real secondary pulley pressure "p2(old)" at the judgment of the speed change failure. Accordingly, in case wherein the target primary pulley pressure "P1(old)" and the target secondary pulley pressure "P2(old)" at the judgment of the speed change failure are set to the primary pulley pressure and secondary pulley pressure at the judgment of the speed change failure, it is preferable to reduce the value of the allowable input torque "TL" that is calculated based on the target primary pulley pressure "P1(old)" and target secondary pulley pressure "P2(old)".

Thus, in case wherein the allowable input torque is calculated by using the target primary pulley pressure "P1(old)" and the target secondary pulley pressure "P2(old)" at the judgment of the speed change failure, the calculation of the allowable input torque "TL" is made by setting the primary pulley rotation speed "N1" and secondary pulley rotation speed "N2", which would appear just before the judgment of the speed change failure at the time of stopping the vehicle, to zero (viz., N1=0, and N2=0). That is, the calculation of the allowable input torque "TL" controlled at the starting of the vehicle is carried out on the premise that the belt-CVT 5 effects no power transmission. That is, in this case, since the belt-CVT 5 is assumed to make no power transmission, the target primary pulley pressure "P1" and the target secondary pulley pressure "P2" has no part of the centrifugal pressure produced when the pulleys 10 and 11 are rotated. Thus, the allowable input torque "TL" derived based on the target primary pulley pressure "P1(old)" and the target secondary pulley pressure "P2(old)" shows a value smaller than a value of the allowable input torque that is derived based on the target pulley pressures during the time when the torque transmission is carried out just before the judgment of the speed change failure. Accordingly, if the rotation speeds of the primary and secondary pulleys 10 and 11 just before the judgment of the speed change failure are set to zero (viz., N1=0, and N2=0), it is possible to get an allowable input torque that is very close to the allowable input torque that is derived based on the real primary pulley pressure "p1(old)" and the real secondary pulley pressure "p2(old)" that appear just before the judgment of the speed change failure.

In the following, calculation of the allowable input torque by using the target speed ratio "I" based on information signals from the primary and secondary pulley speed sensors 26 and 27 will be described.

As is known, the allowable input torque "TL" can be calculated based on the speed ratio. Thus, it may be thought out that the allowable input torque is calculated by using the real speed ratio "i" or target speed ratio "I" that is calculated based on the information signals from the speed sensors 26 and 27 at the speed change failure, that is, the information signals on the rotation speed that the speed sensors 26 and 27 detect lastly.

Referring back to the flowchart of FIG. 10, as is known from the steps of S1 and S2, by fixing the primary pulley pressure "p1" and secondary pulley pressure "p2" to certain values using the judgment of the step S1 as a trigger, the progress of the speed change is suppressed. However, due to existence of an inevitable time-lag on hydraulic pressure, it sometimes occurs that the real speed ratio "i1" at the time of vehicle stopping is shifted to a side lower than a side that is provided by the real speed ratio "i2" that is read lastly. In this case, the real speed ratio "i2" read lastly is smaller than the real speed ratio "i1" at the vehicle stopping. In view of this inequality, an allowable input torque "TL2" calculated based on the real speed ratio "i2" read lastly is larger than an allowable input torque "TL1" calculated based on the real speed ratio "i1" at the vehicle stopping. Accordingly, if a torque control is carried out based on the allowable input torque "TL2" that is larger than the allowable input torque "TL1", undesired belt slippage tends to occur.

While, the target speed ratio "I" calculated based on the real speed ratio "i2" read lastly is shifted to a side lower than a side of the real speed ratio "i2" and the real speed ratio "i1", that is, "i1<i2<I" is established. Accordingly, even if "i2<i1" is made, an allowable input torque "TL3" calculated based on the target speed ratio "I" does not exceed the allowable input torque "TL1". Thus, in this case, undesired belt slippage is suppressed and precise calculation of the allowable input torque is achieved.

Referring back to the flowchart of FIG. 10, at step S4, judgment is carried out as to whether an action for starting the vehicle is carried out or not. For this judgment, at least one of an information signal from the accelerator pedal stroke degree sensor 24 and an information signal from a brake pedal sensor (not shown) is practically used.

If NO at step S4, that is, when it is judged that there is no action for starting the vehicle, the programmed operation of step S4 is repeated every given period. That is, in this case, it is judged that the vehicle still stops and the primary pulley pressure and the secondary pulley pressure are kept fixed.

While, if YES at step S4, that is, when it is judged that there is an action for starting the vehicle, the operation flow goes to step S5.

At step S5, a limitation of the input torque is made. That is, the engine 1 is controlled so that the input torque "T" produced at the starting of the vehicle does not exceed the allowable input torque "TL" calculated at step S3.

Thus, the engine control unit 21 and the engine 1 constitute an input torque limiting means at a restarting of the vehicle.

As is described hereinabove, by fixing the primary pulley pressure and secondary pulley pressure to the values that appear just before the judgment of the speed change failure, the belt-CVT 5 is forced to change from a normal condition that has assumed just before the speed change failure to carry out the normal lowest speed change control to a condition wherein a speed change hardly occurs. In addition to this, the input torque "T" that usually increases upon occurrence of action for starting the vehicle is controlled to the allowable input torque "TL" that permits the proper lowest speed change control that has been carried out just before the failure of the lowest speed change control. Accordingly, even when the driver depresses the accelerator pedal 24 so deeply for starting the vehicle, the input torque "T" is not increased so greatly. Thus, the starting performance of the vehicle is not lowered and undesired belt slippage is suppressed or at least minimized.

At step S6, judgment is carried out as to whether the speed change control at the vehicle starting is possible or not. If NO, that is, if detection of either one of the primary pulley rotation speed "N1" and the secondary pulley rotation speed "N2" is impossible, it is so judged that at the starting of the vehicle, the belt-CVT 5 still fails to carry out the speed change control represented by the graph of FIG. 7. In this case, the operation flow goes back to step 54 and the hydraulic control by which the primary pulley pressure and the secondary pulley pressure are fixed to the values that would appear just before the judgment of the speed change failure is kept.

While, if YES at step S6, that is, if detection of both the primary pulley rotation speed "N1" and the secondary pulley rotation speed "N2" is possible, it is so judged that at the starting of the vehicle, the belt-CVT 5 is able to carry out the speed change control represented by the graph of FIG. 7. In this case, the operation flow goes to step S7.

At step S7, the control by which the input torque "T" of the belt-CVT 5 is limited to the allowable input torque "TL3" by controlling the drive torque from the engine 1 is canceled. With this, the engine control unit 21 is returned to a normal mode fro controlling the engine 1. That is, the engine control unit 21 constitutes an input torque control canceling means at a starting of the vehicle. With this, the time for which the input torque "T" is limited for suppressing the belt slippage can be reduced, and thus, the returning of the belt-CVT 5 to the normal condition wherein the vehicle can exhibit a satisfied starting performance can be speedily made.

Furthermore, at step S7, the hydraulic control by which the primary pulley pressure and the secondary pulley pressure are fixed to the values that would appear just before the judgment of the speed change failure is cancelled. With this, the pulley pressure control section 202 is returned to its normal mode, and thus, the solenoids 31 and 62 of the pressure reducing valves 30 and 61 are controlled to produce the primary pulley pressure "p1" and the secondary pulley pressure "p2" in accordance with the information signals from the primary and secondary pulley speed sensors 26 and 27.

Figure 11:
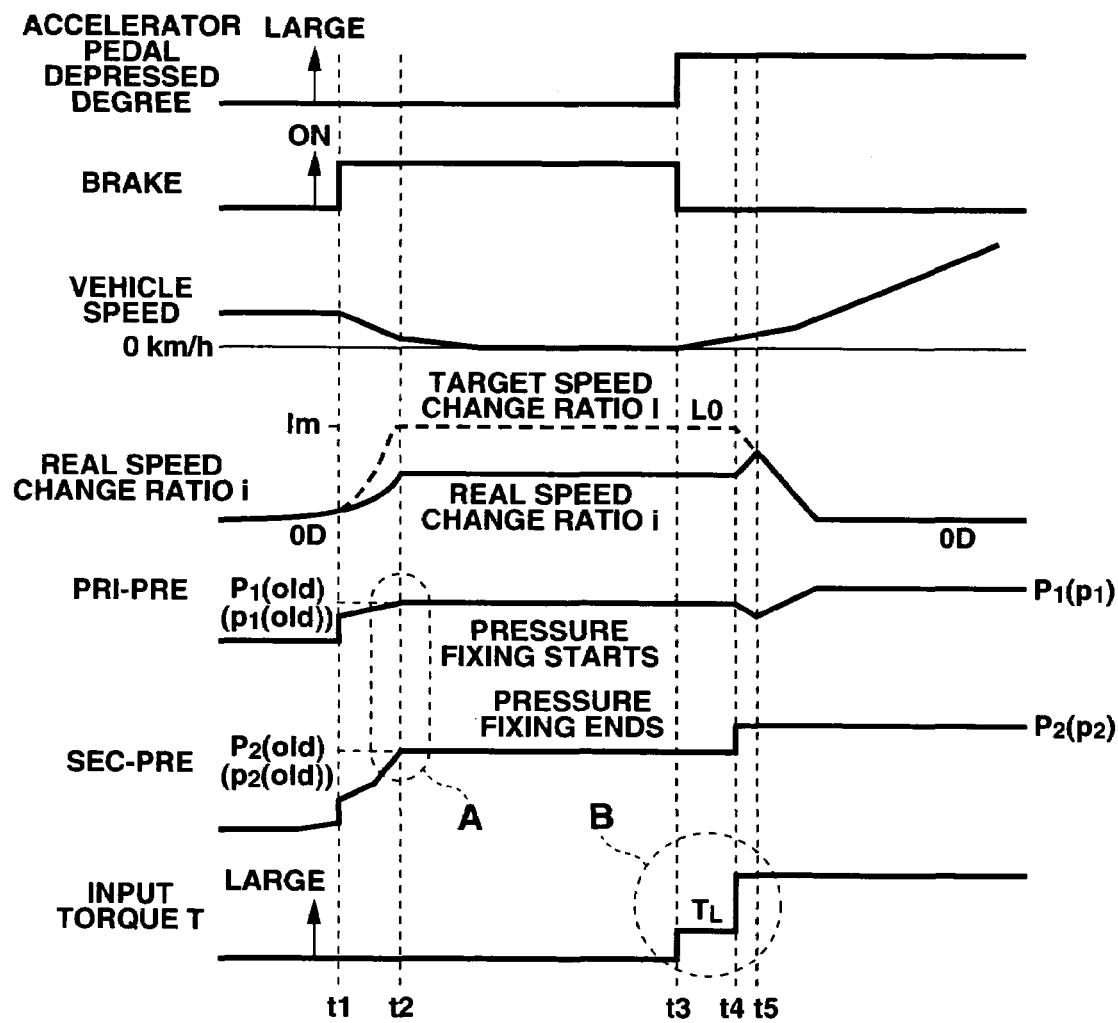
FIG. 11 is a time chart showing conditions of various operation factors from a time when, under a coast cruising in D-range, the vehicle is stopped with a rapid braking to a time when the vehicle starts to run again.

FIG. 11 is a time chart showing conditions of various factors from a time when, under a coast cruising in D-range, the vehicle is stopped with a rapid braking to a time when the vehicle starts to run again. In the following, the programmed operation steps of FIG. 10 will be reviewed with reference to the time chart of FIG. 11.

When, under the coast cruising of the vehicle in D-range with the accelerator pedal released, the brake pedal is rapidly depressed at time "t1", a target speed ratio "I" is looked up from the map in order that the speed ratio "i" can finally take the value of the lowest speed position (viz., the lowest speed ratio), and based on this target speed ratio "I", a primary pulley pressure "PRI-PRE" and a secondary pulley pressure "SEC-PRE" for the primary and secondary pulleys 10 and 11 are controlled. In the time chart, "P1(old)" (or "p1(old)") is shown as the primary pulley pressure "PRI-PRE" and, "P2 (old)" (or "p2(old)") is shown as the secondary pulley pressure "SEC-PRE".

However, due to the vehicle stopping by the rapid braking, at time "t2" when detection of the primary pulley rotation speed "N1" by the speed sensor 26 and that of the secondary pulley rotation speed "N2" by the other speed sensor 27 are impossible, the real speed ratio "i" shown by a solid line fails to precisely follow the target speed ratio "I" shown by a broken line, thereby to leave therebetween a difference "ΔI" that is larger than a predetermined value "Io".

It is now to be noted that in the conventional technique, after time "t2", derivation of the real speed ratio "I" based on the real primary pulley rotation speed "p1" and the real secondary pulley rotation speed "p2" has not been carried out. That is, in the conventional technique, the primary pulley pressure "p1 (P1)" and the secondary pulley pressure "p2 (P2)" are feedback controlled without usage of such real speed ratio "I". As has been mentioned hereinabove, in this case, the following undesired condition tends to occur in the belt-CVT. That is, even when, due to stopping of the vehicle, there is no power transmission action in the belt-CVT, feeding of the primary pulley pressure "p1" or the secondary pulley pressure "p2" to the corresponding pulley 10 or 11 is kept. In this case, a radial displacement of the belt 12 relative to the pulley groove tends to occur due to the hydraulic pressure that is applied to the pulley groove to reduce the width of the groove.

However, in the present invention, when, at time "t2", the difference "ΔI" between the target speed ratio "I" and the real speed ratio "I" is larger than the predetermined value "Io", the primary pulley pressure "PRI-PRE" (viz., p1 (P1)) and the secondary pulley pressure "SEC-PRE" (viz., p2 (P2)) are fixed to "P1(old)" (or "p1(old)") and "P2(old)" (or "p2(old)") respectively after the time "t2", as is indicated by the ellipse "A" shown by a broken line in the time chart of FIG. 11. In this case, even when, at the time of stopping the vehicle, a speed change failure occurs, the normal speed control that has been carried out before the speed changer failure is still maintained. Accordingly, the above-mentioned undesired phenomenon wherein the belt 12 is displaced caused by the continuation of application of the primary pulley pressure "p1" and the secondary pulley pressure "p2" to the pulleys 10 and 11 is suppressed.

From time "t2" to time "t3" when, with the vehicle kept halted, the brake pedal is kept depressed having the throttle valve open degree kept lower than a predetermined degree, the hydraulic pressures "p1" and "p2" applied to the primary and secondary pulleys 10 and 11 are kept constant. Thus, for that time, the undesired belt slippage is suppressed.

When, at time "t3", the accelerator pedal 24 is depressed after releasing the brake pedal, the drive torque from the engine 1 is controlled as is indicated by the circle "B" shown by a broken line, and thus, the torque applied to the belt-CVT 5 is controlled not to exceed the allowable input torque "TL". Accordingly, an optimum input torque that does not induce the undesired belt slippage can be precisely set and the input torque "T" is not excessively restrained, and thus, the starting performance of the vehicle is kept well.

At time "t4" when detection of the primary pulley rotation speed "N1" and the secondary pulley rotation speed "N2" by the respectively primary and secondary speed sensors 26 and 27 becomes possible, the input torque restraining control is canceled. Thus, at time "t5", the real speed ratio "i" becomes matched with the target speed ratio "I", and thus, the primary pulley pressure, the secondary pulley pressure and the torque "T" inputted to the belt-CVT 5 are returned to their normal values.

In the following, advantages of the present invention will be described.

In the present invention, at the time when the vehicle is going to stop, judgment as to whether a speed change failure has occurred or not is carried out. As is mentioned hereinabove, the speed change failure is such a failure that the real speed ratio "i" is not returned to a value corresponding to the lowest speed position at such vehicle stopping state. If the judgment is so made that the speed change failure has occurred, the primary pulley pressure and the secondary pulley pressure are fixed to values that are predetermined for such failure. Thus, if the speed change failure actually occurs during the vehicle stopping, a speed change control toward the lowest speed position is suspended and another control for fixing the primary and secondary pulley pressures to the predetermined values is carried out. Under this condition, the speed change operation of the belt-CVT 5 hardly occurs. Accordingly, undesired belt slippage that would occur when the change speed is too high is suppressed, and undesired belt squeezing phenomenon, which would occur when, due to stopping of a vehicle, a power transmission is not carried out in the belt-CVT 5, feeding the primary and secondary pulleys 10 and 11 with the hydraulic pressure is kept thereby to push up or move up or squeeze the V-belt 12 on the pulleys 10 and 11, is suppressed.

Furthermore, when it is judged that there is a speed change failure under such vehicle stopping state, an allowable input torque "TL" sufficient for keeping the condition of the belt-CVT 5 at the judgment of the speed change failure is calculated based on at least one of the primary pulley pressure and the secondary pulley pressure at the judgment of the speed change failure, at least one of the primary pulley rotation speed and the secondary pulley rotation speed at the judgment of the speed change failure and the target speed ratio "I" at the judgment of the speed change failure, and upon restarting of the vehicle, the upper limit of the input torque "T" for the belt-CVT 5 is controlled to the calculated allowable input torque "TL". In this case, the primary pulley pressure and the secondary pulley pressure are fixed to the values that are shown at the speed change failure, so that the belt-CVT 5 is permitted to keep the operating condition appearing just before the speed change failure, and the input torque "T", that would increase in accordance with the restarting operation of the vehicle, is controlled to the allowable input torque "TL". Accordingly, even when the driver makes a hard operation to the belt-CVT 5 for restarting the vehicle, the input torque "T" applied to the belt-CVT 5 is not excessively increased, and thus, deterioration of the vehicle starting performance is suppressed, and the undesired belt slippage relative to the primary and secondary pulleys 10 and 11 is suppressed or at least minimized.

When the vehicle is restarted, the normal speed change control takes place. That is, upon restarting of the vehicle, the control based on the allowable input torque "TL" becomes canceled. Accordingly, the time for which the restriction of the input torque "T" is kept for suppressing the belt slippage can be reduced to the minimum. In other words, the belt-CVT 5 can be quickly returned to a condition wherein the vehicle exhibits an improved starting performance.

The real primary pulley pressure "p1" and the real secondary pulley pressure "p2" are detected by the hydraulic sensors 40 and 41 respectively. These real pulley pressures "p1" and "p2" are set to the primary and secondary pulley pressures that are practically used when, at the time of stopping the vehicle, the speed change failure is found. Thus, at the time when the primary and secondary pulley pressures are fixed to the values that are predetermined at the speed change failure, the fixation of the primary and secondary pulley pressures is so made as to carry out the exact or precise speed change by the belt-CVT 5. Thus, undesired belt squeezing phenomenon is assuredly suppressed. Furthermore, in this case, the centrifugal pressure produced under rotation of the primary and secondary pulleys 10 and 11, that is contained in the real primary and secondary pulley pressures under the power transmission operation of the belt-CVT 5, is considered. Accordingly, for calculation of the allowable input torque "TL", the torque "TL" can take its highest but allowable value by a degree that corresponds to the centrifugal pressure. Accordingly, the vehicle starting performance can be increased while avoiding the undesired belt slippage.

Furthermore, at the time when the vehicle is going to stop, a target primary pulley pressure "P1" and a target secondary pulley pressure "P2" are calculated based on the primary and second pulley rotation speeds "N1" and "N2" that would appear just before judgment of the speed change failure. These target pressures "P1" and "P2" are set as the primary and secondary pulley pressures at the time when the speed change failure occurs. That is, setting of the primary and secondary pulley pressures is achieved without usage of pressure sensors. This brings about reduction in cost of the belt-CVT 5.

In case wherein the primary pulley pressure sensor 40 and the secondary pulley pressure sensor 41 are not provided, the control for the primary and second pulley pressures can not use a feedback controlling that uses the real pulley pressures "p1" and "p2" detected by the sensors 40 and 41. Accordingly, in such case, preciseness of calculation of the allowable input toque "TL" is somewhat lowered as compared with a case wherein the real primary pulley pressure "p1" and the real secondary pulley pressure "p2" at the judgment of the speed change failure are used for calculation of the allowable input toque "TL". Accordingly, in case wherein the target primary pulley pressure "P1(old)" and the target secondary pulley pressure "P2(old)" just before the judgment of the speed change failure are set to the primary and second pulley pressures at the judgment of the speed change failure, it is preferable to reduce the value of the allowable input torque "TL" calculated based on the target pulley pressures "P1" and "P2".

Furthermore, at the time of stopping the vehicle, the primary pulley rotation speed "N1" and the secondary pulley rotation speed "N2" at the judgment of the speed change failure are set to zero (0) for calculation of the allowable input torque "TL". That is, calculation of the allowable input toque "TL" practically used in the restarting of the vehicle is made on the assumption that the belt-CVT 5 does not carry out a power transmission. Thus, the target primary pulley pressure "P1" and the target secondary pulley pressure "P2" do not include a centrifugal pressure that would be produced when the pulleys 10 and 11 are rotated, and thus, the allowable input toque "TL" calculated based on such target values "P1" and "P2" shows a value that is smaller than a value that would be calculated based on target values provided when the belt-CVT 5 carries out the power transmission. Accordingly, when the primary pulley rotation speed "N1" and the secondary pulley rotation speed "N2" at the judgment of the speed change failure are set to zero (0), the allowable input toque thus calculated shows a value that is very near an allowable input toque that is calculated based on the real primary pulley pressure "p1" and the real secondary pulley pressure "p2".

Furthermore, the YES judgment for the speed change failure is made when at the time of stopping the vehicle, the difference between the target speed ratio "I" and the real speed ratio "i" is greater than the predetermined value "Io" and at least one of the primary and secondary pulley rotation speeds "N2" and "N2" is not detected. This is not a difficult judgment because of usage of existing information.

In the present invention, if desired, the following modifications may be employed.

That is, if desired, the calculation of the allowable input torque "TL" may be carried out during the time from the time "t2" when the detection of the primary pulley rotation speed "N1" and the secondary pulley rotation speed "N2" becomes impossible and the time "t3" when the driver depresses the accelerator pedal 24 after releasing the brake pedal. Furthermore, if desired, the fixing of the primary and secondary pulley pressures to the values that have been kept just before the judgment of the speed change failure may be made at the time "t3" when the driver begins to make an operation for starting the vehicle.

The entire contents of Japanese Patent Application 2005-166951 filed Jun. 7, 2005 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A belt type continuously variable transmission of a motor vehicle, comprising:
   a primary pulley adapted to be driven by a prime mover;
   a secondary pulley adapted to be connected to drive road wheels of the vehicle;
   a belt operatively put around the primary and secondary pulleys;
   first and second hydraulically actuating systems for varying a practical diameter of the primary pulley and that of the secondary pulley by being applied with first and second hydraulic pressures respectively;
   first and second rotation speed sensors that detect a rotation speed of the primary pulley and that of the secondary pulley respectively; and
   a control unit that varies a speed ratio between the primary and secondary pulleys by controlling the first and second hydraulically actuating systems, the control unit having an ability of putting a real speed ratio into agreement with a target speed ratio that is calculated based on the rotation speeds of the primary and secondary pulleys detected by the first and second rotation speed sensors, the target speed ratio being set between a value corresponding to a lowest speed position of the transmission and a value corresponding to a highest speed position of the transmission;
   wherein the control unit comprises:
      a real speed ratio calculating section that calculates the real speed ratio based on the rotation speeds of the primary and secondary pulleys detected by the first and second rotation speed sensors;
      a speed change failure detecting section that detects a speed change failure when, at a time of stopping the vehicle, at least one of the first or second rotation speed sensors fails to detect a corresponding rotation speed, the speed change failure being a failure wherein at the time of stopping the vehicle, the real speed ratio fails to return to the value corresponding to the lowest speed position of the transmission; and
      a pulley pressure fixing section that, when the speed change failure is detected, fixes the first and second hydraulic pressures to predetermined values provided for the speed change failure; and
   wherein the predetermined values correspond to a value of the primary pulley pressure and to a value of the secondary pulley pressure respectively at the time of detection of the speed chance failure.

2. A belt type continuously variable transmission as claimed in claim 1, in which the control unit further comprises:
   an allowable input torque calculating section that, when the speed change failure is detected, calculates an allowable input torque based on at least one of the first or second hydraulic pressures, at least one of the rotation speed of the primary pulley or that of the secondary pulley, and the target speed ratio, the allowable input torque being a torque that is fed to the primary pulley from the prime mover while satisfying a condition of the transmission just before the speed change failure;
   a restart time input torque restriction section that controls the input torque to the allowable input torque when an action for restarting the vehicle takes place; and
   a canceling section that, upon restarting of the vehicle, cancels the operation of the pulley pressure fixing section and that of the restart time input torque restriction section when the first and second rotation speed sensors are both able to detect the rotation speed.

3. A belt type continuously variable transmission as claimed in claim 1, further comprising a primary pulley pressure sensor that detects the first hydraulic pressure and a secondary pulley pressure sensor that detects the second hydraulic pressure, and in which the pulley pressure fixing section functions to set the first hydraulic pressure and the second hydraulic pressure, that are detected by the primary and secondary pulley pressure sensors at the time of detecting the speed change failure, to the predetermined values provided for the speed change failure.

4. A belt type continuously variable transmission as claimed in claim 1, in which the control unit further comprises a target pulley pressure calculating section that, based on the rotation speed of the primary pulley and that of the secondary pulley, calculates a target value of the first hydraulic pressure and a target value of the second hydraulic pressure, and in which the pulley pressure fixing section functions to set the target value of the first hydraulic pressure and the target value of the second hydraulic pressure, that are provided just before detection of the speed change failure, to the predetermined values provided for the speed change failure.

5. A belt type continuously variable transmission as claimed in claim 2, in which the allowable input torque calculating section functions to set the rotation speed of the primary pulley and that of the secondary pulley at detection of the speed change failure to zero (0).

6. A belt type continuously variable transmission as claimed in claim 1, in which the speed change failure detecting section detects the speed change failure when a difference between the real speed ratio and the target speed ratio at the time when at least one of the first or second rotation speed sensors fails to detect the rotation speed of the corresponding pulley is greater than a predetermined value.

7. A belt type continuously variable transmission as claimed in claim 1, in which the speed change failure detecting section detects the speed change failure when a deceleration of the vehicle is higher than a predetermined degree and a difference between the real speed ratio and the target steed change ratio at the time when at least one of the rotation speed of the primary pulley or that of the secondary pulley fails to be detected is greater than a predetermined value.

8. A belt type continuously variable transmission of a motor vehicle, comprising:
   a primary pulley adapted to be driven by a prime mover;
   a secondary pulley adapted to be connected to drive road wheels of the vehicle;
   a belt operatively put around the primary and secondary pulleys;
   first and second hydraulically actuating systems for varying a practical diameter of the primary pulley and that of the secondary pulley by being applied with first and second hydraulic pressures respectively;
   first and second rotation speed sensors that detect a rotation speed of the primary pulley and that of the secondary pulley respectively; and
   a control unit that varies a speed ratio between the primary and secondary pulleys by controlling the first and second hydraulically actuating systems, the control unit having an ability of putting a real speed ratio into agreement with a target speed ratio that is calculated based on the rotation speeds of the primary and secondary pulleys detected by the first and second rotation speed sensors, the target speed ratio being set between a value corresponding to the lowest speed position of the transmission and a value corresponding to the highest speed position of the transmission;

wherein the control unit comprises:
- a real speed ratio calculating means that calculates the real speed ratio based on the rotation speeds of the primary and secondary pulleys detected by the first and second rotation speed sensors;
- a speed change failure detecting means that detects a speed change failure when, at the time of stopping the vehicle, at least one of the first or second rotation speed sensors fails to detect the rotation speed, the speed change failure being a failure wherein at the time of stopping the vehicle, the real speed ratio fails to return to the value corresponding to the lowest speed position of the transmission;
- a pulley pressure fixing means that, when the speed change failure is detected, fixes the first and second hydraulic pressures to predetermined values provided for the speed change failure;
- an allowable input torque calculating means that, when the speed change failure is detected, calculates an allowable input torque based on at least one of the first or second hydraulic pressures, at least one of the rotation speed of the primary pulley or that of the secondary pulley, and the target speed ratio, the allowable input torque being a torque that is fed to the primary pulley from the prime mover while satisfying the condition of the transmission just before the speed change failure;
- a restart time input torque restriction means that controls the input torque to the allowable input torque when an action for restarting the vehicle takes place; and
- a canceling means that, upon restarting of the vehicle, cancels the operation of the pulley pressure fixing section and that of the restart time input torque restriction means when the first and second rotation speed sensors are both able to detect the rotation speed;

wherein the predetermined values correspond to a value of the first hydraulic pressure and a value of the second hydraulic pressure at the time of detection of the speed change failure.

* * * * *